Oct. 9, 1928.
E. D. SAWYER
1,687,147
BARRIER DEVICE FOR STOPPING VEHICLES
Filed Dec. 27, 1921    2 Sheets-Sheet 1
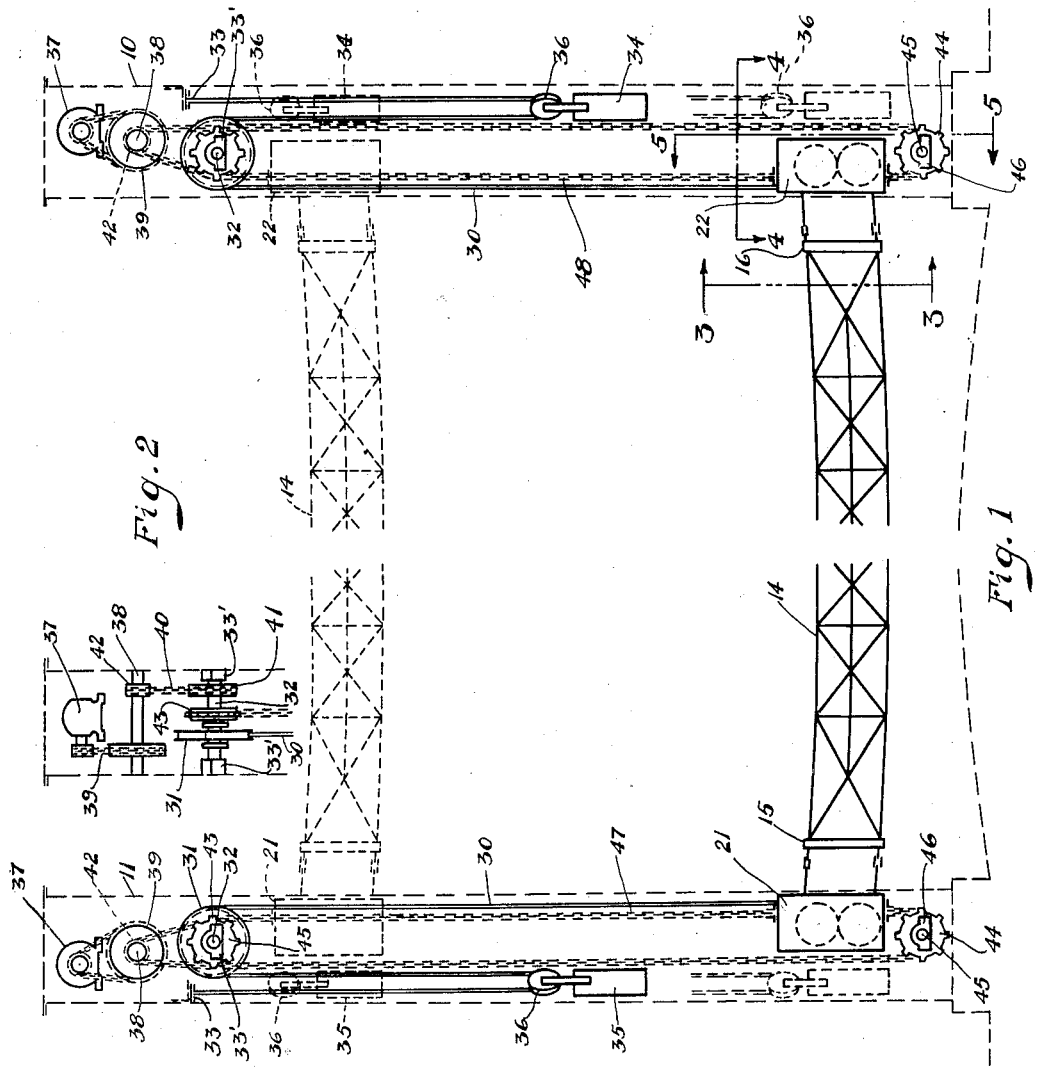
WITNESSES:
INVENTOR.
Emerson D. Sawyer
BY
ATTORNEY.

Oct. 9, 1928.
E. D. SAWYER
1,687,147
BARRIER DEVICE FOR STOPPING VEHICLES
Filed Dec. 27, 1921  2 Sheets-Sheet 2
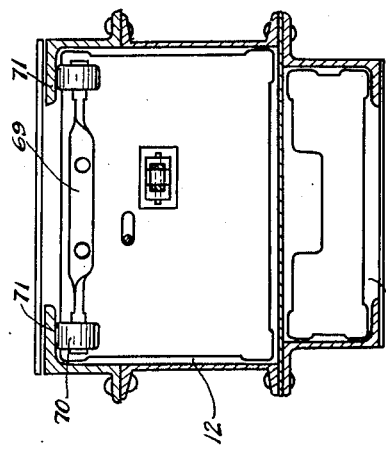
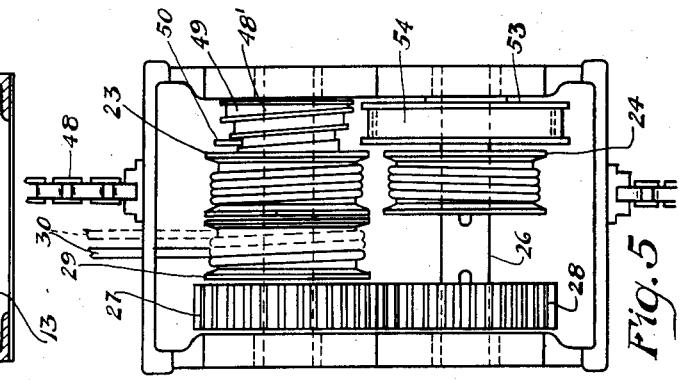
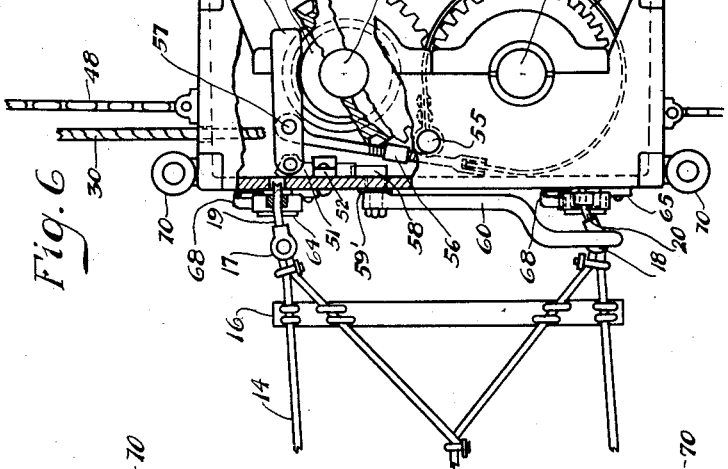
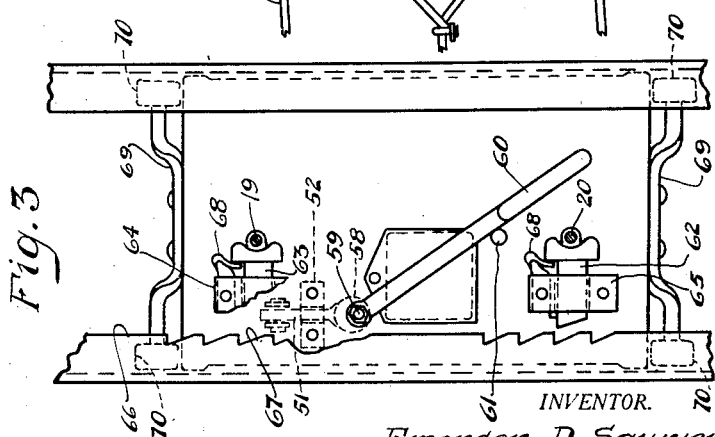
WITNESSES:
INVENTOR.
Emerson D. Sawyer
BY
ATTORNEY.

Patented Oct. 9, 1928.

1,687,147

UNITED STATES PATENT OFFICE.

EMERSON D. SAWYER, OF CHICAGO, ILLINOIS.

BARRIER DEVICE FOR STOPPING VEHICLES.

Application filed December 27, 1921. Serial No. 525,236.

My invention relates to improvements in barrier devices for stopping vehicles, and has for its principal object the provision of a barrier device of this character which will be highly efficient in use and economical in manufacture.

A further object of my invention is the provision of a device of this character for barring vehicles, travelling either at a low or high rate of speed, at railroad crossings, bridges, or other points where such vehicles and occupants thereof are liable to be injured unless stopped.

A further object of my invention is the provision of a mechanism associated with the barrier which will automatically produce a resistance according to the impact of a vehicle, whether the vehicle be light or heavy, and travelling at a low or high rate of speed.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of the invention, Fig. 2 is a sectional detail view of the top of one of the columns showing the mechanism for raising and lowering the barrier, embodied in the invention, Fig. 3 is a fragmentary side elevational view of one of the columns taken substantially on line 3—3 of Fig. 1, Fig. 4 is a sectional detail view of one of the columns embodied in the invention, taken substantially on line 4—4 of Fig. 1, Fig. 5 is a rear elevational view of one of the movable carriages, embodied in the invention, taken substantially on line 5—5 of Fig. 1, and Fig. 6 is a side elevational view of the carriage illustrated in Fig. 5, partly broken in section to illustrate the mechanism within the box.

In carrying my invention into effect, I provide columns 10 and 11, fixed on each side of a roadway along which vehicles are to be stopped in times of danger; the adjacent faces of said columns being open to permit the raising and lowering of the means for stopping a vehicle. The columns 10 and 11 are divided into two vertical passages 12 and 13, as shown in Fig. 4, for the purposes of which will be more fully set forth. Arranged between the columns 10 and 11 is a yieldable barrier 14 in the form of a net work of cable, as shown, supported at each end by stiffening bars 15 and 16. The opposite ends of the barrier are connected through the medium of links 17 and 18 to the ends of reserve cables 19 and 20, which are held within carriages 21 and 22 arranged to slide within the passages 12 of each of the columns 10 and 11. The cables 19 and 20, passing into the carriages 21 and 22 are wound around cable drums 23 and 24 which are fixedly secured to transverse shafts 25 and 26. The shafts 25 and 26 are operatively connected together by gears 27 and 28 also fixedly secured to the said shafts. Mounted on each of the shafts 25 between the gears 27 and the cable drums 23 are cable drums 29 on which are wound cables 30. The free end of the cables 30 pass upwardly through the passages 12 around pulleys 31 fixedly secured to transverse shafts 32 journalled in bearings 33' within each of the columns 10 and 11, as shown in Fig. 2. From the pulleys 31, the ends of the cables 30 are fixedly secured, by any suitable means, to each of the columns 10 and 11, adjacent the top thereof, as at 33. Counter weights 34 and 35 are arranged within the passages 13 and fixedly secured to pulleys 36 around which the cables 30 pass.

The construction so far set forth, is such that when the barrier 14, in its operative position as shown in full lines Fig. 1, receives the impact of a vehicle the cables 19 and 20 will be unwound from the cable drums 23 and 24 permitting the barrier to yield in the direction of the travel of the vehicle, as will be necessary to gradually stop the vehicle without overturning the same, or injuring the occupants thereof. At the same time that the cables 19 and 20 are unwound from the cable drums 23 and 24, the cables 30 are being simultaneously wound around the cable drums 29, raising the counter weights 34 and 35 within the passages 13. Upon retarding of the barrier 14 the counter weights drop back into their initial position within the passages 13, causing the cables 30 to unwind from the cable drums 29. Upon the unwinding operation of the cables 30, the cables 19 and 20 are simultaneously rewound around the cable drums 23 and 24, as will be readily understood.

Means is provided for raising and lowering the barrier 14 into and out of operative position. This means comprises a power driven motor 37, of any approved type, arranged within each of the columns 10 and 11, adjacent the tops thereof. The motor 37 is operatively connected to a shaft 38 journalled within each of the columns through the medium of a sprocket chain 39. The shafts 32 are operatively connected to the shafts 38 by sprocket chains 40 which pass over sprocket gears 41 and 42. Fixedly mounted on each of the shafts 32, is a sprocket gear 43 which is operatively connected to a sprocket gear 44, fixedly mounted on a shaft 45, journalled in bearings 46, mounted within each of the columns 10 and 11 adjacent the bottoms thereof, by the sprocket chains 47 and 48. The ends of the sprocket chains 47 and 48 are fixedly secured, by any suitable means, to each of the carriages 21 and 22, as shown. By this arrangement, the barrier can be readily lowered into and raised out of operative position when desired.

The weight of the counter weights 34 and 35 is such, that they produce a resistance upon paying out of the cables 19 and 20, when the barrier receives the impact of a vehicle. As will be understood, the resistance of the barrier is adequate at all times whether receiving the impact from a vehicle travelling at a low or high rate of speed. It is my object to provide means which will be governed by the barrier to produce a resistance according to the force of the impact. In this connection, co-operating with the counter weights 34 and 35, I provide frictional means which is controlled by the barrier, the construction of which is as follows:

Mounted on each of the shafts 25, adjacent each of the cable drums 23, is a spiral groove cone-shaped pulley 48', key-seated to the said shafts and operative therewith. Engaging the spiral grooves 49 of the cone-shaped pulleys 48, is an oscillatory lever arm 50 pivotally connected to a vertical extending fulcrum arm 51, which is slidably mounted in a bearing 52 secured to the rear wall of each of the carriages 21 and 22. Fixedly mounted on each of the shafts 26, is a brake drum 53 and associated therewith is a friction brake band 54, one end of the brake band 54 being fixedly secured to the transverse shaft 55 within each of the carriages 21 and 22. The opposite end of the brake band 54 is fixedly secured to a turn buckle 56 which is pivotally connected to the lever arm 50 by a pintle 57, Fig. 6. Eccentrics 58 are mounted on stud shafts 59, within the carriages 21 and 22, and arranged to engage the lower end of each of the fulcrum arms 51, as at 59', said eccentrics being operated by hand levers 60 fixedly secured to the stud shafts 59, as shown in Fig. 3. The hand levers 60 are supported in the position shown in full lines, in Fig. 3, by means of lateral pins 61.

The arrangement of this construction is such that upon paying out of the cables 19 and 20, the cone pulleys 48 are caused to rotate through the medium of the paying out of the cables. Upon rotation of the cone pulleys 48, the lever arms 50 follow the spiral grooves 49, tightening the brake bands 54 around the brake drums 53. This application of the brake bands 54 upon the brake drums 53 produces a resistance according to the impact received by the barrier. It is thus seen that the resistance of the barrier is automatically regulated through the medium of the barrier itself. For example, the impact received by the barrier from a vehicle travelling at a high rate of speed, is caused to pay out the cables 19 and 20 to produce a resistance. This paying out of the cables 19 and 20 causes the lever arms 50 to draw the brake bands tight and the more the cable is paid out, the tighter the brake bands contact the brake drums. It will be thus seen that when the barrier is struck by a vehicle travelling at a low rate of speed, the resistance will be regulated according to the force of the impact, or on the other hand, when the barrier is struck by a vehicle travelling at a high rate of speed, the resistance is also governed according to the force of the impact.

Upon retarding of the barrier 14, the hand levers 60 are raised, rotating the eccentrics 58 and permitting the fulcrum arms 51 to drop downwardly within the bearings 52, thus releasing the tight engagement of the lever arms 50 with respect to the spiral grooves 49. Upon releasing of the lever arms 50, the counter weights 34 and 35 are permitted to drop downwardly in the passages 13, causing the paid out cables 19 and 20 to rewind on the cable drum 23 and 24. As long as the lever arms 50 tightly engage in the grooves 49, the cable drums 23 and 24 are not permitted to rotate. It will be thus seen that in order to rewind the paid out cables 19 and 20 around the cable drums 23 and 24, it will be first necessary to disengage the tight engagement of the lever arms 50, this being accomplished through the medium of the eccentrics and hand levers.

To prevent the carriages 21 and 22 from moving upwardly within the passages 12, when the barrier receives the impact, I provide spring actuated pawls 62 and 63, slidably mounted transversely in brackets 64 and 65 which are fixedly secured to each of the adjacent walls of the carriages 21 and 22. The ends of the cables 19 and 20, which are fixedly secured to the links 17 and 18 pass through the outer ends of the pawls as shown in Fig. 6.

This arrangement is such that when the barrier receives the impact the pawls are forced toward the edge 66 of each of the openings of the columns into engagement with teeth 67 formed in the edges 66. The pawls 62 and 63 are held out of engagement with the teeth 67 by spring members 68. It will be readily seen that by this arrangement the carriages are prevented from either moving upwardly or downwardly within the passages 12 when the barrier receives the impact.

Means is provided to brake the shock of the carriages against the adjacent walls of the columns when the barrier receives the impact. This means comprises shafts 69 fixedly secured to the bottom and top of each of the carriages. The outer ends of the shafts 69 are formed of resilient material bearing rollers 70 which ride on the inner surfaces of the walls 71 of each of the columns. By this arrangement when the barrier receives the impact the rollers will lessen the shock of the carriages against the walls of the columns, as will be readily understood.

By my improved barrier a vehicle travelling either at a high or low rate of speed can be gradually stopped without overturning the vehicle or injuring the occupants thereof. The device is especially adapted for use at railroad crossings, bridges or other points of danger.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising oppositely arranged columns; a barrier between said columns adapted to resist the impact of a vehicle; carriages mounted on said columns for slidable movement; flexible reserve members within said carriages and secured to said barrier to permit said barrier to move in the direction of the travel of a vehicle striking the same; and means actuated by the movement of said barrier for increasing the resistance thereof.

2. A device of the class described comprising oppositely arranged columns; a barrier between said columns adapted to resist the impact of a vehicle; carriages mounted for slidable movement on said columns; flexible reserve members within said carriages and secured to said barrier to permit movement of said barrier in the diection of the travel of a vehicle striking the same; and brake continuously operative from the moment of said vehicle striking said barriers, mechanism arranged in said carriages for increasing the resistance of said barrier.

3. A device of the class described comprising oppositely arranged columns; a barrier between said columns adapted to resist the impact of a vehicle; carriages mounted on said columns for slidable movement; flexible reserve members within said carriages and secured to said barrier to permit movement of said barrier in the direction of the travel of a vehicle striking the same; and frictionally controlled means within said carriages and actuated by said barrier for increasing the resistance thereof.

4. A device of the class described comprising oppositely arranged columns; a barrier between said columns adapted to be brought into operation for stopping a vehicle; carriages mounted for slidable movement on said columns; flexible reserve members within said carriages to pemit movement of said barrier in the direction of the travel of said vehicle; means actuated by the payment out of said reserve members to prevent movement of said carriages; and weight actuated means for retarding said reserve members.

5. A device of the class described comprising oppositely arranged columns; a barrier between said columns adapted to be brought into operation for stopping a vehicle; carriages slidably mounted for movement on said columns; reserve cables within said carriages to permit said barrier to move in the direction of the travel of said vehicle; means controlled by said cables to prevent movement of said carriages during the paying out of said cables therefrom; and means for increasing the resistance of said barrier.

6. A device of the class described comprising oppositely arranged columns; a barrier between said columns adapted to be brought into operation for stopping a vehicle; carriages mounted for slidable movement on said columns; flexible reserve members within said carriage to permit said barrier to move in the direction of the travel of said vehicle; weight actuated means for retarding said flexible reserve members; and brake mechanism arranged in said carriages for increasing the resistance of said barrier.

7. A device for stopping vehicles comprising oppositely arranged columns; a barrier between said columns adapted yieldingly and frictionally to resist an impact, said barrier adapted to be moved longitudinally with respect to said columns to bring said barrier into or out of operative position; and releasable means for preventing the moving of said barrier longitudinally with respect to said columns when in operative position.

8. A device for stopping vehicles comprising columns arranged on opposite sides of a roadway; a barrier extending across said roadway between said columns; carriages slidably mounted longitudinally on said columns; reserve members within said carriages and fixedly secured to said barrier to permit said barrier to move in the direction of the travel of a vehicle striking said barrier; and means including a friction brake a cone shaped pulley and a member engaging said pulley and actuated by the paying out of said reserve members, for increasing the resistance of said barrier upon being struck by a vehicle.

9. A device for stopping vehicles comprising oppositely arranged columns; a barrier between said columns, said barrier adapted to be moved longitudinally with respect to said columns to bring said barrier into or out of operative position; releasable means for preventing the moving of said barrier longitudinally with respect to said columns when in operative position, said releasable means being actuated through the medium of said barrier when struck by a vehicle; and means for increasing the resistance of said barrier.

10. A device for stopping vehicles comprising columns arranged on opposite sides of a roadway; a barrier extending across said roadway between said columns; carriages slidably mounted longitudinally on said columns; reserve members within said carriages and fixedly secured to said barrier to permit said barrier to move in the direction of the travel of a vehicle striking said barrier; and releasable means for increasing the resistance of said barrier upon being struck by a vehicle.

11. A device for stopping vehicles comprising columns arranged on opposite sides of a roadway; a cable net work transversing said roadway between said columns; carriages slidably mounted on said columns; reserve cables within said carriages to permit said barrier to travel in the direction of the travel of a vehicle striking said barrier; spiral groove cone pulleys within said carriages; and means engaging the grooves of said pulleys for increasing the resistance of said barrier.

12. A device of the class described comprising oppositely arranged columns; a barrier between said columns; reciprocatory carriages on said columns; reserve cables within said carriages and fixedly secured to said barrier to permit said barrier to move in the direction of the travel of a vehicle striking said barrier; counter weights for retarding said reserve cables; spiral groove cone pulleys within said carriages; a pivotally mounted lever arm engaging said spiral grooves; and means associated with said lever arm for increasing the resistance of said barrier.

13. A device for stopping vehicles comprising oppositely arranged columns; a barrier between said columns; slidably mounted carriages on said columns; reserve cables within said carriages and fixedly secured to said barrier; groove pulleys within said carriages; lever arms pivotally mounted within said carriages and engaging the grooves of said pulleys; and friction brakes associated with said lever arms for increasing the resistance of said barrier.

14. A device for stopping vehicles comprising oppositely arranged columns; a barrier between said columns; carriages slidably mounted on said columns; reserve cables within said columns and fixedly secured to said barrier to permit said barrier to move in the direction of the travel of a vehicle upon striking said barrier; means for preventing the movement of said carriages when said barrier is struck by a vehicle; means actuated by said barrier for increasing the resistance thereof; and means for releasing said increasing means.

15. A device for stopping vehicles, the combination with oppositely arranged supports having vertically extending passages, of a barrier between said supports; carriages slidably mounted in said passages; reserve cables within said carriages and fixedly secured to said barrier to permit said barrier to move in the direction of the travel of a vehicle striking said barrier; and shock absorbing means carried by said carriages for resisting the shock communicated to said carriages when said barrier is struck by a vehicle.

16. A device for stopping vehicles, the combination with oppositely arranged supports having vertically extending passages, of a barrier between said supports; carriages slidably mounted in said passages; reserve cables within said carriages and fixedly secured to said barrier to permit said barrier to move in the direction of the travel of a vehicle striking said barrier; shock absorbing means carried by said carriages for resisting the shock communicated to said carriages when said barrier is struck by a vehicle; and means actuated by said barrier for increasing the resistance thereof.

17. A device for stopping vehicles comprising a barrier; and means for increasing the resistance of said barrier, said means comprising a frictional brake and means operable by said barrier for actuating said brake.

18. A device for stopping vehicles comprising oppositely arranged columns; carriages associated with said columns; a barrier associated with said carriers for stopping a vehicle; and means carried by each of said carriers and engaging said columns to prevent movement of said carriages during the operation of said barrier.

19. A device for stopping vehicles including oppositely arranged columns, carriages associated with said columns, a barrier carried by said columns for stopping a vehicle and shock absorbing means including friction means continuously operative associated with each of said carriages.

20. A device for stopping vehicles including oppositely arranged columns, carriages associated with said columns, a barrier carried by said columns for stopping a vehicle; shock absorbing means associated with each of said carriages; and brake mechanism arranged in said carriages for increasing the resistance of said barrier.

21. A device for stopping vehicles comprising a barrier; movable members at each end of said barrier; and frictionally controlled brake mechanism arranged in each of said movable members for increasing the resistance of said barrier when struck by a vehicle.

22. A device for stopping vehicles comprising a barrier adapted to be brought into operation to stop a vehicle; movable members at each end of said barrier; means arranged in said movable members for permitting the movement of said barrier in the direction of the travel of said vehicle; and frictionally controlled mechanism arranged in said movable members and actuated by said barrier for increasing the resistance thereof upon being struck by a vehicle.

23. A device for stopping vehicles comprising oppositely arranged columns; movable members associated with said columns; a barrier between said columns; and brake mechanism continuously operative within said movable members for increasing the resistance of said barrier.

24. A device for stopping vehicles comprising oppositely arranged columns; carriages mounted on said columns for longitudinal movement; and means within said carriages and actuated by said barrier for continuously increasing the resistance thereof upon being struck by a vehicle.

25. A device for stopping vehicles including a barrier, reserve cables fixed to said barrier to permit said barrier to move in the direction of the travel of a vehicle striking the same, means actuated by the paying out of said reserve cables including a grooved pulley a pivotally mounted arm engaging the grooves of said pulley and a friction brake actuated by said arm, for increasing the resistance of said pulley, means for retarding said reserve cables, and means for disengaging said pivotally mounted arm of the grooves of said pulley for permitting the retarding of said cables.

26. A barrier for vehicles comprising supports on opposite sides of the roadway, an impact receiving part adapted to be extended across the roadway between said supports, a controlling mechanism by means of which the position of said impact receiving part is controlled, and means for relieving the strain on said controlling mechanism when the impact receiving part is struck by a moving vehicle.

27. A barrier for vehicles comprising supports on opposite sides of the roadway, an impact receiving part adapted to be extended across the roadway between said supports, a controlling mechanism by means of which the position of said impact receiving part is controlled, and means for transferring the strain on said controlling mechanism to said supports when the impact receiving part is struck by a moving vheicle.

28. A barrier for vehicles comprising a flexible impact receiving device extending across the space to be protected, controlling mechanism for raising and lowering said impact receiving device, and means for relieving the strain on said controlling mechanism when the impact receiving part is struck.

In testimony whereof I have signed my name to this specification.

EMERSON D. SAWYER.